(12) United States Patent
Cao

(10) Patent No.: US 7,935,330 B2
(45) Date of Patent: *May 3, 2011

(54) METHOD OF MAKING POROUS CRYSTALLINE MATERIALS

(75) Inventor: Guang Cao, Branchburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 831 days.

This patent is subject to a terminal disclaimer.

(21) Appl. No.: 11/899,776

(22) Filed: Sep. 7, 2007

(65) Prior Publication Data

US 2008/0069769 A1    Mar. 20, 2008

Related U.S. Application Data

(60) Provisional application No. 60/845,032, filed on Sep. 15, 2006.

(51) Int. Cl.
*C01B 39/04* (2006.01)
*C01B 37/00* (2006.01)

(52) U.S. Cl. ............... 423/704; 423/304; 423/305

(58) Field of Classification Search ............ 423/704, 423/304, 305
See application file for complete search history.

(56) References Cited

U.S. PATENT DOCUMENTS

| | | | |
|---|---|---|---|
| 4,610,854 A | 9/1986 | Zones | |
| 7,635,462 B2 * | 12/2009 | Cao et al. | 423/713 |
| 2002/0081262 A1 * | 6/2002 | Elomari | 423/704 |
| 2003/0091504 A1 | 5/2003 | Pasquale et al. | |

OTHER PUBLICATIONS van deer Waal et al, "Synthesis and characterization of aluminum-free zeolite titanium beta using di(cyclhexylmethyl)dimethylammonium as a new and selective template", Mlcroporous and Mesoporous Materials, Elsevier Science Publishing, NY, vol. 25, No. 1-3, (Dec. 1998).*
J. C. Van Der Waal, P. J. Kooyman, J. C. Jansen, H. Van Bekkum; "Wynthesis and characterization of aluminum-free zeolite titanium beta using di(cyclohexylmethyl)dimethylammonium as a new and selective template," Microporous and Mesoporous Materials 25 (1988) 43-57.

* cited by examiner

*Primary Examiner* — David M Brunsman
(74) *Attorney, Agent, or Firm* — Ann M. Mareschal

(57) ABSTRACT

The present invention relates to new methods of making crystalline materials, as well as to new crystalline materials obtainable by such methods, and their use in hydrocarbon conversion processes. In one of its aspects, the invention relates to a method for preparing a crystalline molecular sieve comprising oxides of one or more tetravalent element(s), optionally one or more trivalent element(s), and optionally one or more pentavalent element(s), said method comprising submitting to crystallization conditions one or more sources of said oxides in the presence of at least one organic templating agent R of formula $C^1C^2R^1R^2N^+ A^-$ (I), in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine.

29 Claims, 5 Drawing Sheets

METHOD OF MAKING POROUS CRYSTALLINE MATERIALS

This application claims the benefit of U.S. Provisional Application No. 60/845,032 filed Sep. 15, 2006.

FIELD OF THE INVENTION

The present invention relates to new methods of making crystalline materials using dicycloalkylammonium compounds as organic templating agents, as well as to new crystalline materials obtainable by such methods, and their use in hydrocarbon conversion processes.

BACKGROUND OF THE INVENTION

Zeolites and zeolite-like materials are porous crystalline materials made of tetrahedral or octahedral oxide building blocks, linked together through tetrahedral or octahedral corner oxygen atoms. There are many ways in which the tetrahedral or octahedral building blocks may link to form polynuclear complex structures, having different topologies. In some structures, the building blocks link to form infinite chains, forming fibrous needlelike crystals. In other structures, the building blocks are linked in layers or sheets. In yet other structures, the building blocks are linked in three dimensions with mutual sharing of oxygen atoms, thereby forming a framework structure containing void spaces, such as channels (pores) and cavities. The chemical composition of zeolites and zeolite-like materials, as well as the nature of the void space and the interconnecting channels is responsible for the catalytic and shape selective properties of each zeolite or zeolite-like structure. Zeolites and zeolite-like materials can have channels that may or may not intersect with each other. When the channels intersect with each other, the channel intersections may form cavities within the crystal structure. Many natural and synthetic zeolites or zeolite-like materials with distinct crystal structures are currently known and are recognizable by distinct and characteristic X-ray diffraction patterns.

Zeolites and zeolite-type materials are used as sorbents and/or catalysts in many commercial processes, particularly in petroleum refining and petrochemical processes. For petroleum refining and petrochemical processes, zeolites and zeolite-like materials having two- or a three-dimensional pore network containing large cavities are of particular interest.

Typically, synthetic zeolite and zeolite-like molecular sieves are prepared by crystallization of an aqueous reaction mixture containing sources of the desired inorganic oxide building blocks and an organic templating (i.e. structure-directing) agent, such as a nitrogen-containing compound. By varying the synthesis conditions, zeolite or zeolite-like structures of many kinds can be prepared. While each element of the synthesis may have an influence on the type of structure that crystallizes, the organic templating agent often plays an important role in defining the types and sizes of the channels and cavities in the resultant crystalline products. However, the type of crystal structure that might be obtained from a given synthesis mixture with any given organic templating agent is currently unpredictable. Many different kinds of amines and ammonium compounds have thus been reported to be suitable organic templating agents for various crystalline molecular sieve structures.

For example, WO 03/106341 discloses a method of synthesizing silicoaluminophosphate and aluminophosphate molecular sieves of the CHA framework type, using as templating agent at least one tertiary amine in which one of the substituents on the nitrogen atom is a cycloalkyl group or a heterocyclic group, most preferably N,N-dimethylcyclohexylamine.

In some cases, many different organic templating agents have been shown to direct a single molecular sieve structure (see for example R. M. Barrer, 1989, Zeolite Synthesis, ACS Symposium 398, ed. M. L. Occelli and H. E. Robson, pp. 11-27, American Chemical Society). In other cases, the synthesis of certain zeolites or zeolite-like materials has only been reported with very specific types of organic templating agents, that are not readily and conveniently available for commercial-scale synthesis. For example, the synthesis of ITQ-21 has only been reported up to now with N(16)-methylsparteinium hydroxide as structure directing agent (see A. Corma et al., Nature, Vol. 418, August 2002, pp. 514-517; U.S. Pat. Nos. 6,849,248; 6,998,037; 7,008,612 and US Patent Application Publication Nos. 2005/0165,267; 2005/0192469; 2005/018259, all incorporated herewith by reference). The synthesis of ITQ-7 has only been reported up to now with a 1,3,3-trimethylcyclo-6-azonium-[3.2.1.4$^{6.6}$] dodecane compound as structure directing agent (see L. Villaescusa et al., Angew. Chem. Int. Ed., 1999, 38, No. 13/14, pp. 1997-2000 and in U.S. Pat. No. 6,652,831).

There is thus a continuing need to find new organic templating agents suitable for the synthesis of zeolites or zeolite-like materials, especially those having large pores and/or large cavities.

SUMMARY OF THE INVENTION

In a first aspect, the invention relates to a method for preparing a crystalline molecular sieve comprising oxides of one or more tetravalent element(s), optionally one or more trivalent element(s), and optionally one or more pentavalent element(s), said method comprising submitting to crystallization conditions one or more sources of said oxides in the presence of at least one organic templating agent R of formula $C^1C^2R^1R^2N^+A^-$ (I), in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine.

In a second aspect, the present invention relates to the use, in a method for preparing a crystalline molecular sieve comprising oxides of one or more trivalent element(s), optionally one or more tetravalent element(s), and optionally one or more pentavalent element(s), of an organic templating agent R of formula $C^1C^2R^1R^2N^+A^-$ (I), in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine. In a third aspect, the invention relates to a crystalline molecular sieve, comprising an organic templating agent of formula $C^1C^2R^1R^2N^+A^-$ (I), in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine.

In each of these aspects, preferred organic templating agents are those compounds of formula (I) that have one or more of the following features:

$C^1$ and $C^2$ both represent a cyclohexyl group, $R^1$ and $R^2$ each independently represent a methyl group, an ethyl group or a propyl group, A represents hydroxyl.

In a particularly preferred embodiment the compound of formula (I) is a N,N-dimethyldicyclohexylammonium compound, conveniently, N,N-dimethyldicyclohexylammonium hydroxide, or a N,N-methylethyldicyclohexylammonium compound, conveniently N,N-methylethyldicyclohexylammonium hydroxide.

The invention is applicable to a broad range of molecular sieve types, and is particularly suitable for molecular sieves having the ISV framework type, the BEA* framework type, the CHA framework type, the AEI framework type, the framework type of ITQ-21, or any combination of these framework types.

In yet another aspect, the invention relates to a hydrocarbon conversion process comprising the step of contacting a hydrocarbon feedstock with a catalyst comprising a crystalline molecular sieve according to the invention, or a crystalline molecular sieve prepared by the method of the invention.

DETAILED DESCRIPTION OF THE INVENTION

Figure 1:
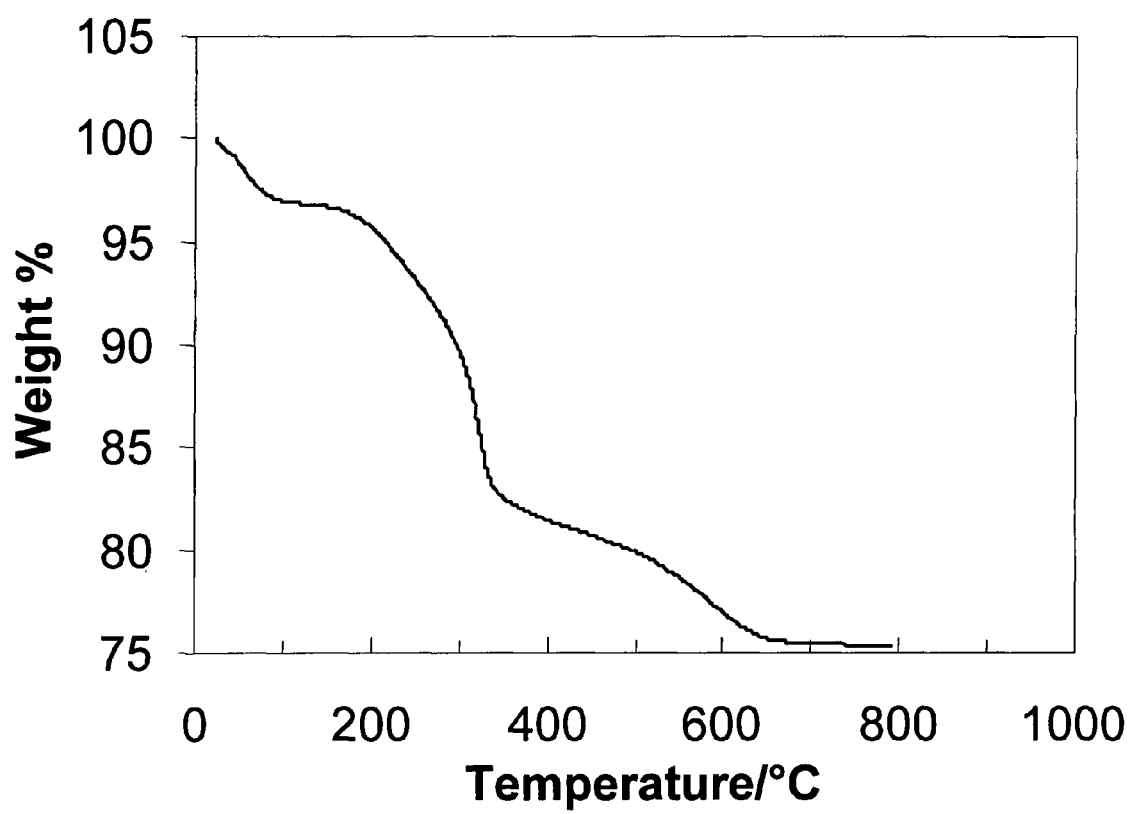
FIG. 1 shows the thermogravimetric analysis obtained for a crystalline material prepared according to the invention.

The present invention relates to a method for preparing zeolites and zeolite-like molecular sieves, particularly those molecular sieves that have large pore sizes and/or large cavities, that is, pore diameters and/or cavity diameters greater than about 6.0 Angstroms.

As used herein, the expressions "zeolites and zeolite-like materials" or "zeolites and zeolite-like molecular sieves" or derivatives thereof refer to crystalline materials having a fixed, open-network structure, made of oxides of one or more tetravalent element(s), optionally one or more trivalent element(s), optionally one or more pentavalent element(s). The tetravalent element may be selected from the group consisting of silicon, germanium and combinations thereof. The trivalent element may be selected from aluminum, boron, iron, indium, gallium, chromium and combinations thereof. Preferably, the trivalent element is aluminum. Conveniently, the pentavalent element is phosphorus. Zeolites and zeolite-type materials thus include silicates, aluminates, silico-aluminates, alumino-silicates, aluminophosphates, silicoaluminophosphates, as well as metal-subsituted forms thereof, including molecular sieves in which metal substitution is partial or complete, and including molecular sieves in which metal substitution has occurred during crystallization of the molecular sieve or after crystallization of the molecular sieve (post-synthesis).

We have found that quaternary ammonium compounds of formula $C^1C^2R^1R^2N^+A^-$ (I) in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine can be used as structure directing agents for the preparation of zeolites or zeolite-type molecular sieves.

Examples of suitable $C^1$ and $C^2$ include cyclohexyl, cyclopentyl, methylcyclohexyl, methylcyclopentyl, dimethylcyclohexyl, dimethylcyclopentyl, trimethylcyclohexyl and trimethylcyclopentyl groups.

Examples of suitable rings containing 5 or 6 atoms when $R^1$ and $R^2$ together with the nitrogen atom they are connected with form a ring containing 5 or 6 atoms, include piperidine, pyridine, morpholine, pyrrolidine and pyrrole heterocycles.

Preferably, $R^1$ and $R^2$ each independently represent a methyl group or an ethyl group.

Preferred compounds of formula (I) are those that include one or several of the following features:

$C^1$ and $C^2$ both represent a substituted or unsubstituted cyclohexyl group, conveniently an unsubstituted cyclohexyl group;

$R^1$ and $R^2$ each independently represent a methyl group, an ethyl group or a propyl group, A represents hydroxyl.

Non-limiting examples of suitable compounds of formula (I) include N,N-dimethyldicyclohexylammonium compounds, conveniently, N,N-dimethyldicyclohexylammonium hydroxide, N,N-diethyldicyclohexylammonium compoundss, conveniently, N,N-diethyldicyclohexylammonium hydroxide, N,N-dipropyldicyclohexylammonium compounds, conveniently, N,N-dipropyldicyclohexylammonium hydroxide, N,N-dimethyldicyclopentylammonium compounds, conveniently, N,N-dimethyldicyclopentylammonium hydroxide, N,N-diethyldicyclopentylammonium compounds, conveniently N,N-diethyldicyclopentylammonium hydroxide, or N,N-dipropyldicyclopentylammonium compounds, conveniently N,N-dipropyldiclopentylammonium hydroxide.

In one preferred embodiment, the structure directing agent is a N,N-dimethyldicyclohexylammonium compound, for example, N,N-dimethyldicyclohexylammonium hydroxide, N,N-dimethyldicyclohexylammonium fluoride, N,N-dimethyldicyclohexylammonium chloride, N,N-dimethyldicyclohexylammonium bromide, N,N-dimethyldicyclohexylammonium iodide.

The present invention also encompasses the use of mixtures of one or more organic templating agent of formula (I).

The compounds of formula (I) are either available commercially, or can easily be prepared by methods known in the art, for example, by reacting the corresponding amines with an appropriate alkylating agent.

The molecular sieves are typically prepared by crystallization of an aqueous reaction mixture containing sources of the desired inorganic oxide building blocks and at least one organic templating agent of formula (I).

When the tetravalent element is silicon, suitable sources of silicon oxide include silicates, e.g., tetraalkyl orthosilicates, fumed silica, such as Aerosil (available from Degussa), and aqueous colloidal suspensions of silica, for example Ludox (DuPont de Nemours), Nyacol (Nyacol Nano Technologies), Nalco (Nalco Chemical Company), Ultra-Sol (RESI Inc), NexSil (available from NNTI). When the tetravalent element is germanium, suitable sources of germanium include germanium ethoxide and germanium oxide. The source of germanium is conveniently $GeO_2$.

If used, suitable sources of aluminum oxide include aluminum salts, especially water-soluble salts, such as aluminum nitrate, as well as hydrated aluminum oxides, such as boehmite and pseudoboehmite. If used, suitable sources of phosphorus oxide include phosphoric acid in its various forms, phosphorus oxides, phosphorus chlorides, phosphorus alkoxides, trialkyl phosphates, for example, triethyl phosphate, and mixtures thereof.

Optionally, the synthesis mixture also contains a source of fluoride. Suitable sources of fluoride include hydrogen fluoride, although other sources of fluoride such as alkali metal fluorides, or fluoride salts of silicon sources, fluoride salts of aluminum sources or fluoride salts of the organic directing agent may also be used.

The method of the present invention is suitable for preparing a wide range of molecular sieve structures, in particular zeolite or zeolite-like structures having large pores and/or large cavities. Non-limiting examples of zeolite or zeolite-like molecular sieves having such structures include those having the framework structure of ITQ-21, ITQ-7 (IZA framework type ISV), zeolite beta (IZA framework type BEA*), chabasite and SAPO-34 (IZA framework type CHA), ALPO-18 (IZA framework type AEI), and combinations of such framework structures, such as intergrown or co-crystallized forms thereof.

The crystalline molecular sieves are crystallized from an aqueous solution comprising at least one organic templating agent of formula (I), at least one oxide capable of forming the desired crystalline molecular sieve structure, and optionally at least one source of fluoride ions and/or at least one source of hydroxide ions. The person skilled in the art will however appreciate that a wide range of synthesis mixture compositions and crystallization conditions can be used, depending on the molecular sieve crystal structure that one wishes to crystallize. Crystallization can be carried out under either static, tumbled or stirred conditions in a suitable reactor vessel, such as for example, polypropylene jars or Teflon® lined or stainless steel autoclaves, typically at a temperature in the range of about 50° C. to about 300° C., such as about 135° C. to about 185° C., for a time sufficient for crystallization to occur. Formation of the crystalline product can take anywhere from around 30 minutes up to as much as 2 weeks, such as from about 45 minutes to about 10 days. The duration depends on the type of structure formed and the temperature employed, with higher temperatures typically requiring shorter hydrothermal treatments.

Crystallization may be facilitated by the presence of at least 10 ppm, such as at least 100 ppm, for example at least 500 ppm, conveniently at least 1000 ppm of seed crystals based on total weight of the reaction mixture. If present, it is preferable that the amount of seed crystals does not exceed 3% of the weight of the total weight of the synthesis mixture. The seed crystals can be iso-structural with the desired molecular sieve, for example the product of a previous synthesis, or can be a heterostructural crystalline material. The production of colloidal seed suspensions and their use in the synthesis of molecular sieves are disclosed in, for example, International Publication Nos. WO 00/06493 and WO 00/06494, incorporated herein by reference.

Typically, the crystalline product is formed in solution and can be recovered by standard means, such as by centrifugation or filtration. The separated product can also be washed, recovered by centrifugation or filtration and dried, typically at temperature of less than 200° C.

As a result of the crystallization process, the recovered crystalline product contains within its pores at least a portion of the structure directing agent used in the synthesis. Accordingly, the present invention also relates to a crystalline molecular sieve, comprising an organic templating agent of formula $C^1C^2R^1R^2N^+A^-$ (I), as previously defined. The organic templating agent, and the F component, if used in the synthesis mixture, which are associated with the material as a result of their presence during crystallization, are typically at least partially removed from the molecular sieve by calcination before use, leaving active catalytic sites within the microporous channels and cavities of the molecular sieve open for contact with a feedstock. Calcination consists essentially of heating the molecular sieve comprising the template at a temperature of from about 200° C. to about 800° C. in the presence of an oxygen-containing gas, optionally in the presence of steam. In some cases, it may be desirable to heat the molecular sieve in an environment having a low or zero oxygen concentration, at least for a portion of the calcination process. The molecular sieve crystallites obtained after crystallization may be in the form of single crystals or agglomerates.

To the extent desired and depending on the composition of the material, any cations in the as-synthesized or calcined material can be replaced in accordance with techniques well known in the art, at least in part, by ion exchange with other cations. Preferred replacing cations include metal ions, hydrogen ions, hydrogen precursor, e.g., ammonium ions, or mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

Once the crystalline material of the invention has been synthesized, it can be formulated into a catalyst composition by combination with other materials, such as binders and/or matrix materials, that provide additional hardness or catalytic activity to the finished catalyst.

The crystalline materials described herein can be used to dry gases and liquids; for selective molecular separation based on size and polar properties; as ion-exchangers; as chemical carriers; in gas chromatography; and as catalysts in organic conversion reactions. Accordingly, the present invention also relates to hydrocarbon conversion processes in which a catalyst comprising a crystalline material of the invention is contacted under hydrocarbon conversion conditions with a hydrocarbon feedstock, to form a converted hydrocarbon product. For this purpose, the catalyst may contain other active materials in addition to the porous crystalline material of the invention, such as for example, hydrogenation components.

Non-limiting examples of suitable catalytic uses of the crystalline material described herein include hydrocracking of petroleum feedstocks, hydrogenation processes, for example diesel dewaxing processes, catalytic cracking, for example, fluid catalytic cracking or deep catalytic cracking, aromatic alkylation or the conversion of oxygenates to olefins.

For example, if used in hydrocracking processes, the crystalline materials of the present invention are preferably in the form of a catalyst containing a hydrogenation compound, such as at least one Group VIB metal, conveniently, molybdenum, tungsten or mixtures thereof, at least one Group VII metal, conveniently, iron, cobalt or nickel, or such as a combination of at least one such Group VIB metal and at least one such Group VIII metal, in addition to the crystalline material of the invention and other formulating agents. The present invention thus also relates to a hydrocracking process, in which a petroleum feedstock is contacted with a catalyst comprising the crystalline material of the invention under hydrocracking conditions. Examples of petroleum fractions suitable for such process include vacuum gas oil, for which, typically, 80% by volume of the hydrocarbon compounds boil above 350° C., such as those having a boiling range between 350° C. and 580° C. Typically, the hydrocarbon feedstocks are brought in contact with the hydrocracking catalyst in the presence of hydrogen, usually in a fixed bed reactor. The hydrocracking conditions can vary depending on the type of feed, the desired product quality, as well as the available commercial facilities. Generally, the feedstock is contacted with the catalyst in the presence of hydrogen at a temperature above 200° C., typically between 250° C. and 480° C., preferably between 300° C. and 500° C. Typical pressures are greater than 0.1 MPa, such as greater than 1 MPa. Preferably, the pressure is between 5 MPa and 20 MPa. The hydrogen to hydrocarbon ratio is usually above 50 m$^3$ and generally between 80 m$^3$ and 5000 m$^3$, such as between 200 m$^3$ and 1500 m$^3$ of hydrogen per m$^3$ of hydrocarbon feed. The space velocity (LHSV) is generally between 0.01 and 20, such as between 0.05 and 5 volumes of feed per volume of catalyst per hour.

The invention shall be further illustrated by the following non-limiting examples.

EXAMPLES

In these examples,
TGA (thermogravimetric analysis) was carried out on a TGA 2950 instrument (TA Instrument) that was fitted with a gas feeding system.
SEM (scanning electron microscopy) was carried out on a Hitachi S-4500 instrument. Powders of a sample were sonicated in methanol, and the suspension was dispensed on an SEM sample holder before being mounted onto the SEM sample stage. The SEM images were typically taken with a voltage of 1-2.5 kV.
XRD (X-ray powder diffraction) patterns were obtained on a Siemens D500 diffractometer with voltage of 40 kV and current of 30 mA, using a copper target and a nickel filter ($\lambda=0.154$ nm).
Elemental analysis of Al, Si, and Ge was performed using Inductively Coupled Plasma (ICP) spectroscopy.

Example 1

Synthesis of N,N-dimethyldicyclohexylammonium hydroxide (DMDCHA$^+$OH$^-$)

To a chilled solution of 100 g N-methyldicyclohexylamine (Aldrich) in 50 g ethanol was slowly added 30 g iodomethane (Aldrich). The mixture became lukewarm. To allow dissipation of heat, fifteen minutes were allowed to elapse while the mixture was chilled in an ice-bath before another 30 g iodomethane was added. A rapid release of heat ensued soon after, followed by crystal precipitation. After the mixture was chilled to ice-bath temperature, an additional 27.2 g iodomethane was added, and the mixture was shaken at room-temperature overnight. Large amounts of white crystals formed, which were recovered by decanting the mother liquor.

The crystals were dissolved in an adequate amount of deionized water and the solution was ion-exchanged with MTO-Dowex SBR LCNG OH Form Ion-Exchanger (Supelco) several times until the solution was tested negative for iodide with AgNO$_3$. The solution was concentrated on a rotary evaporator, and the concentration was determined by titration with 0.1 M HCl solution. Thus, 245 mL (density 1.00 g/mL) of a 1.5737 Molar N,N-dimethyldicyclohexylammonium hydroxide (DMDCHA$^+$OH$^-$) solution was obtained, which represented 78.1% overall synthesis yield.

Example 2

10.42 g tetraethylorthosilicate (TEOS, 99% from Aldrich) was added to 19.86 g of a DMDCHA$^+$OH$^-$ solution as prepared in Example 1. Then, 1.31 g amorphous germanium dioxide powder (99.99%, available from Aldrich) was added to the TEOS-DMDCHA$^+$OH$^-$ mixture. The mixture was sealed in a polypropylene bottle and shaken for 24 hours at room temperature, after which a clear solution was obtained. A 48 wt % aqueous solution of hydrofluoric acid (1.33 g, available from Aldrich) was then added to the clear solution, which resulted in immediate precipitation. This slurry was homogenized by vigorous shaking, and was then poured into a plastic dish for water and ethanol evaporation at room temperature. A stream of nitrogen was directed toward the mixture to facilitate evaporation. The evaporation step was terminated once the weight of the mixture reached 15.0 g. This resulting mixture had the following composition:

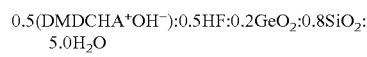

0.5(DMDCHA$^+$OH$^-$):0.5HF:0.2GeO$_2$:0.8SiO$_2$: 5.0H$_2$O

The mixture was divided into two equal portions and transferred to two Teflon lined 23 ml autoclaves. Each portion was heated at 170° C. for 3 and 5 days, respectively, while being tumbled (40 rpm). The solid product was recovered by centrifugation, washing with distilled water and drying in a 50° C. vacuum oven. The products recovered from the autoclaves weighed 2.20 g and 2.40 g, respectively. TGA of the product with three days of crystallization is shown in FIG. 1, which shows that the structure directing agent was completely removed after heating up to 700° C., using a heat up ramp of 10° C./minute, with a total weight loss of 24.7%.

Samples of each product were calcined following this protocol:
(1) In a muffle furnace, heat from room temperature to 400° C. at 10° C./min in flowing N$_2$,
(2) Hold at 400° C. for 30 minutes in flowing N$_2$,
(3) Heat at 10° C./min to 650° C. in flowing air,
(4) Hold at 650 for 5 hours in flowing air.

Figure 2:
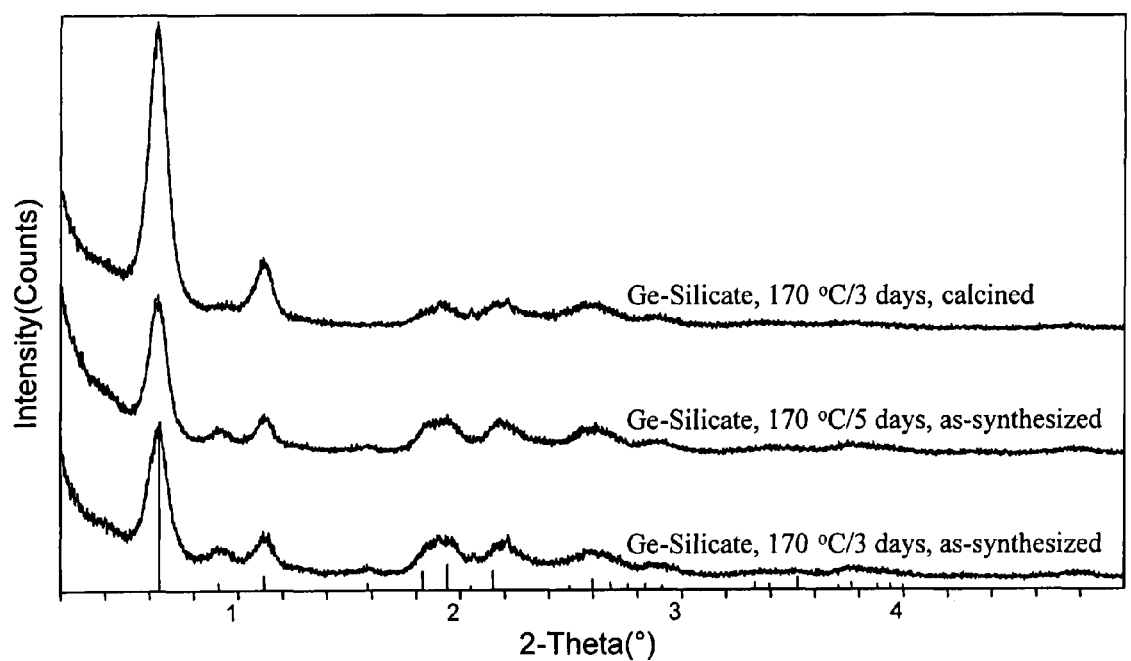
FIG. 2 shows the X-ray powder diffraction pattern of a crystalline material prepared according to the invention, with vertical bars showing the positions and relative intensity of the peaks reported in the literature for ITQ-21.

X-ray diffraction patterns of the as-synthesized and calcined products (shown in FIG. 2, in which the vertical bars indicate the characteristic X-ray diffraction lines for ITQ-21) had peaks at the characteristic d values and degrees 2 θ angles reported for calcined ITQ-21 (see A. Corma et al., Nature, Vol. 418, August 2002, pp. 514-517; U.S. Pat. Nos. 6,849, 248; 6,998,037; 7,008,612 and US Patent Application Publication Nos. 2005/0165267; 2005/0192469; 2005/018259, all incorporated herewith by reference). The X-ray diffraction peaks were however broad. The XRD peak broadening is indicative of a small crystal size. XRD peak broadening due to small crystal size is described by the Sherrer equation: $D=k\lambda/B \cos\theta$, where D is the diameter of a crystal, $\lambda$ is the X-ray wavelength, B is the half-width of the diffraction peak corrected for instrument broadening, and $\theta$ is the diffraction angle. See Azaroff, L. V., Elements of X-ray Crystallography, McGraw-Hill Book Company, New York, 1968, p. 552.

Elemental analysis yielded 23.3% Si and 14.7% Ge for the five days crystallization sample, which corresponds to a molar composition of $Ge_{1.00}Si_{4.10}$.

Example 3

The procedure of Example 2 was reproduced, except no germanium oxide was added. The synthesis mixture before hydrothermal synthesis was:

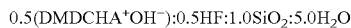

0.5(DMDCHA⁺OH⁻):0.5HF:1.0SiO₂:5.0H₂O

The mixtures were sealed in two Teflon lined 23-ml autoclaves, which were then heated at 170° C. for 3 and 5 days while being tumbled at 40 rpm. The products were recovered as described in Example 2. XRD analysis of the product indicated that the products had the BEA* framework type.

Example 4

Two synthesis mixtures were prepared following the procedure of Example 2, except that a 20 wt % aqueous solution of Al(NO₃)₃.9H₂O was added as an aluminum source to the synthesis mixture. The synthesis mixtures had the following compositions before hydrothermal synthesis:

0.5(*DMDCHA*⁺OH⁻):0.5HF:0.2GeO₂:xAl₂O₃:
0.8SiO₂:5.0H₂O (x=0.01 or 0.02)

To these mixtures was added 0.25 wt % seeds, relative to the total weight of synthesis mixture, the seeds being the material produced in Example 2. The mixtures were sealed in Teflon lined 23-ml autoclaves, which were then heated at 170° C. for 3 days while being tumbled at 40 rpm. The products were recovered and calcined as described in Example 2.

Figure 3:
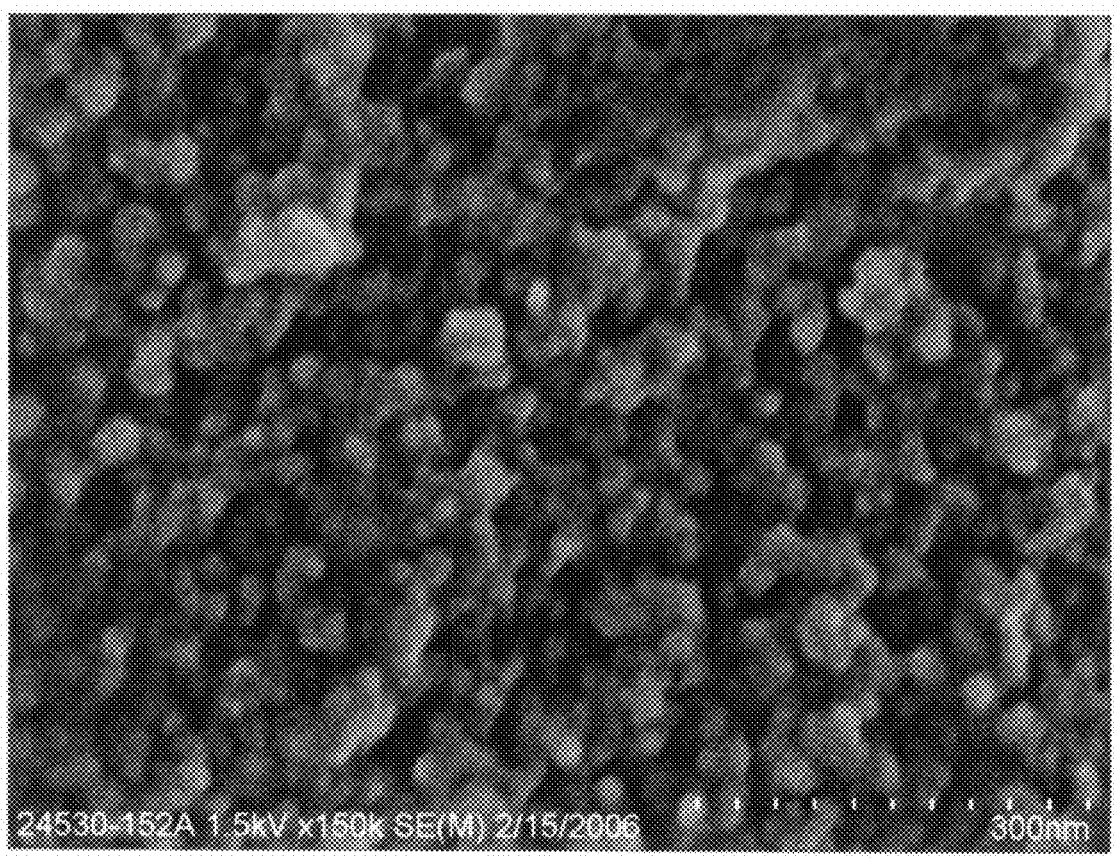
FIG. 3 shows a SEM micrograph obtained for a crystalline material prepared according to invention.
Figure 4:
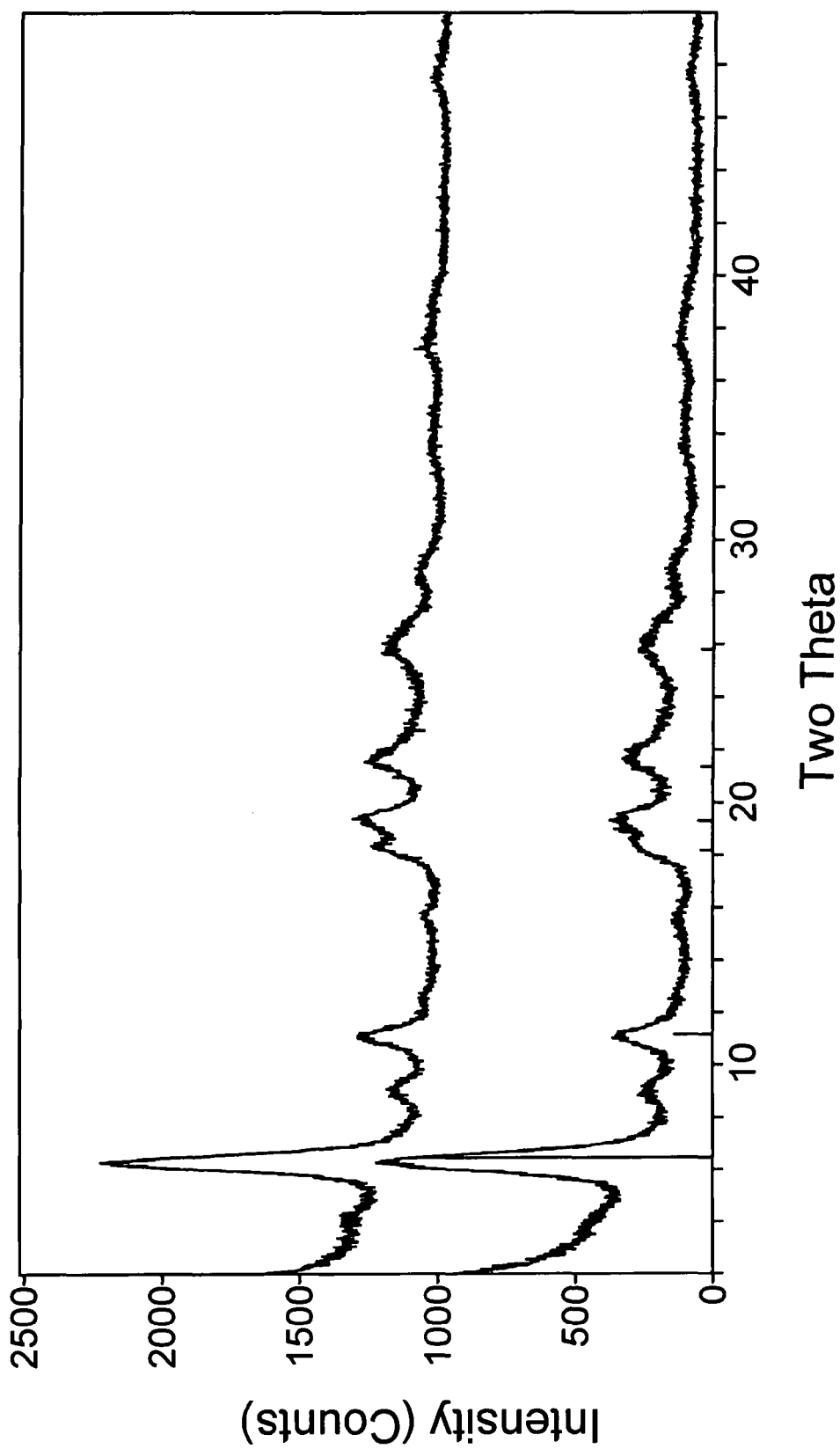
FIG. 4 shows the X-ray powder diffraction pattern of a crystalline material prepared according to the invention, with vertical bars showing the positions and relative intensity of the peaks reported in the literature for ITQ-21.

SEM pictures of the calcined product (shown in FIG. 3 for the x=0.02 case) indicated that the solid product consisted of micron-size agglomerates of small crystallites, measuring about 10 to 20 nm. X-ray diffraction patterns of the as-synthesized products (shown in FIG. 4) were essentially the same as that from Example 2, with X-ray diffraction peaks broadened due to the small crystallite sizes.

Elemental analysis of the product obtained with x=0.01 in the synthesis mixture gave an Al content of 0.042%, a Ge content of 15.1% and an Si content of 23.9%. This corresponds to a molar composition of $Al_{0.00183}Ge_{1.00}Si_{4.09}$. Elemental analysis of the product obtained with x=0.02 in the synthesis mixture, gave an Al content of 0.100%, a Ge content of 15.2% and a Si content of 23.7%. This corresponds to a molar composition of $Al_{0.00438}Ge_{1.00}Si_{4.03}$.

Example 5

The procedure of Example 2 was repeated, except 0.2 wt % seeds (product of Example 2), relative to the total weight of the synthesis mixture, were used. In a first experiment, crystallization was carried out for 3 days. The XRD pattern of the as-synthesized product was identical to the XRD pattern of the as-synthesized products obtained in Example 2. In a second experiment, crystallization was carried out for 7 days. The XRD pattern of the as-synthesized product indicated new sharp peaks, characteristic of nonasil, in addition to the broad XRD features of the product obtained in Example 2.

Example 6

To a solution of 50 g N-methyldicyclohexylamine (Aldrich) in 50 g ethanol was slowly added 47.9 g iodoethane (Aldrich) in four aliquots, stirring for 30 minutes before each aliquot. The mixture was tightly capped in a plastic bottle and was heated in a 50° C. oven for three days. The resulting mixture was chilled in a refrigerator and the crystalline product was isolated by decantation.

The crystals were dissolved in adequate amount of deionized water and the solution was ion-exchanged with MTO-Dowex SBR LCNG OH Form Ion-Exchanger (Supelco) several times until the solution was tested negative for iodide with AgNO₃. The solution concentration was determined by titration with 0.1 M HCl solution. Thus 520.0 mL (density 0.999 g/mL) of 0.3538 M N,N-methylethyldicyclohexylammonium hydroxide (MEDCHA⁺OH⁻) solution was obtained, which represented 71.9% overall synthesis yield.

Example 7

9.65 g tetraethylorthosilicate (TEOS) was added to 81.69 g of the MEDCHA⁺OH⁻ solution as described in Example 6, and then 1.21 g germanium dioxide powder was also added. The mixture was sealed in a polypropylene bottle and shaken for 72 hours at room temperature for TEOS to hydrolyze. To the clear solution so obtained was added 48 wt % aqueous solution of hydrofluoric acid (1.48 g), which resulted in immediate precipitation. This mixture slurry was made uniform by vigorous shaking, and was poured into a plastic dish for evaporation of water and ethanol at room temperature. A stream of nitrogen was directed toward the mixture to facilitate solvent evaporation. The evaporation step was terminated once the weight of the mixture reached 14.0 g. This mixture had the following composition:

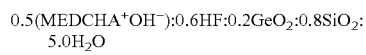

0.5(MEDCHA⁺OH⁻):0.6HF:0.2GeO₂:0.8SiO₂:
5.0H₂O

Figure 5:
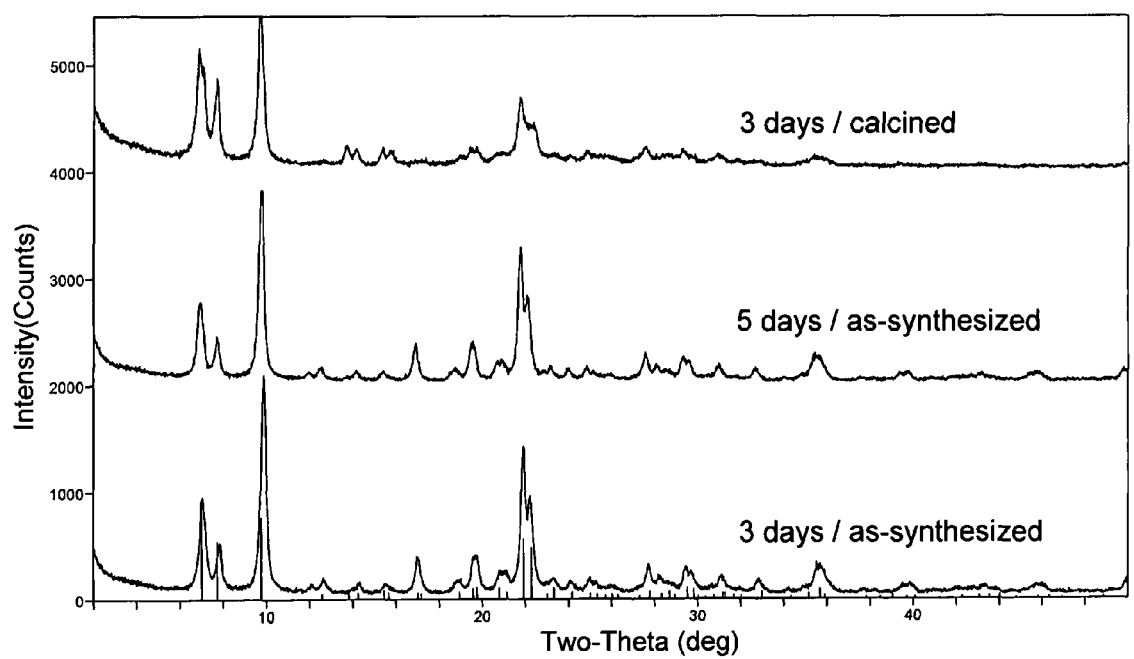
FIG. 5 shows the X-ray powder diffraction pattern of a crystalline material prepared according to the invention, with vertical bars showing the positions and relative intensity of the peaks reported in the literature for ITQ-7.

The mixture was divided into two equal parts and transferred to two Teflon lined 23 ml autoclaves. They were each heated at 160° C. for 3 and 5 days while being tumbled (40 rpm). The solid product was recovered by centrifugation, washing with distilled water and drying in a 50° C. vacuum oven. The products recovered from the two autoclaves weighed 2.10 g and 2.20 g, respectively. XRD showed that the products have peaks with positions coincidental with those of ITQ-7 (see L. Villaescusa et al., Angew. Chem. Int. is Ed., 1999, 38, No. 13/14, pp. 1997-2000; U.S. Pat. No. 6,652,831; IZA framework type code ISV), although peak intensity was not identical (see FIG. 5). Upon calcination (600° C. for 3 hours in air), the crystallinity was retained with only minor changes in peak position and intensity. The calcined sample had a N₂ BET surface area of 249 m²/g.

Example 8

The following ingredients were mixed, in sequence, and blended into a uniform gel using a microhomogenizer (Tissue Tearor Model 98730 available from Biospec Products, Inc, USA): 85 wt % H₃PO₄ (obtained from Aldrich Chemical Company), H₂O, Catapal™ A (74 wt % Al₂O₃, available from CONDEA Vista Company, Texas, USA), Cabosil™ if needed (available from Cabot Corporation, Illinois, USA), and finally N,N-dimethyldicyclohexylammonium hydroxide (DMDCHA$^+$OH$^-$), as prepared in Example 1. The molar ratio of the ingredients was as follows:

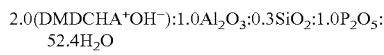
2.0(DMDCHA$^+$OH$^-$):1.0Al$_2$O$_3$:0.3SiO$_2$:1.0P$_2$O$_5$: 52.4H$_2$O After heating for 5 days at 170° C. with the autoclave tumbled at 40 rpm, the solid product in the autoclave was isolated. Yield was 5.1% based the weight of the initial gel. XRD pattern of the products showed that the product has the CHA framework structure, with three-dimensional 8-ring pores. Elemental analysis gave the following anhydrous molar composition: Al$_{1.0}$Si$_{0.186}$P$_{0.746}$.

What is claimed is:

1. A method for preparing a crystalline molecular sieve comprising oxides of one or more tetravalent element(s), optionally one or more trivalent element(s), and optionally one or more pentavalent element(s), said method comprising submitting to crystallization conditions one or more sources of said oxides in the presence of at least one organic templating agent R of formula C$^1$C$^2$R$^1$R$^2$N$^+$ A$^-$(I), in which
C$^1$ and C$^2$ each independently represent an unsubstituted cyclohexyl or cyclopentyl group,
R$^1$ and R$^2$ each independently represent a methyl group, an ethyl group or a propyl group, or R$^1$ and R$^2$ together with the nitrogen atom they are connected to form a ring containing 5 or 6 atoms, and
A represents hydroxyl, fluorine, chlorine, bromine or iodine.

2. The method of claim 1, wherein C$^1$ and C$^2$ both represent a cyclohexyl group.

3. The method of claim 1, wherein R$^1$ and R$^2$ each independently represent a methyl group, an ethyl group or a propyl group.

4. The method of claim 1, wherein A represents hydroxyl.

5. The method of claim 1, wherein the molecular sieve has the ISV framework type, the BEA* framework type, the CHA framework type, the AEI framework type, the framework type of ITQ-21, or any combination of these framework types.

6. The method of claim 1, wherein the compound of formula (I) is a N,N-dimethyldicyclohexylammonium compound.

7. The method of claim 1, wherein the compound of formula (I) is N,N-dimethyldicyclohexylammonium hydroxide.

8. The method of claim 1, wherein the compound of formula (I) is a N,N-methylethyldicyclohexylammonium compound.

9. The method of claim 1, wherein the compound of formula (I) is N,N-methylethyldicyclohexylammonium hydroxide.

10. The method of claim 1, wherein the molecular sieve comprises silicon.

11. The method of claim 10, wherein the molecular sieve further comprises germanium.

12. The method of claim 11, wherein the molecular sieve crystal composition further comprises aluminum.

13. The method of claim 10, wherein the molecular sieve crystal composition further comprises aluminum.

14. The method of claim 12, wherein the molecular sieve crystal composition further comprises phosphorus.

15. The method of claim 1, wherein the sources of oxides are crystallized in the presence of from about 10 ppm to about 3% crystal seeds.

16. A crystalline molecular sieve, comprising an organic templating agent of formula C$^1$C$^2$R$^1$R$^2$N$^+$ A$^-$(I), in which
C$^1$ and C$^2$ each independently represent an unsubstituted cyclohexyl or cyclopentyl group,
R$^1$ and R$^2$ each independently represent a methyl group, an ethyl group or a propyl group, or R$^1$ and R$^2$ together with the nitrogen atom they are connected to form a ring containing 5 or 6 atoms, and
A represents hydroxyl, fluorine, chlorine, bromine or iodine.

17. The method of claim 16, wherein C$^1$ and C$^2$ both represent a cyclohexyl group.

18. The method of claim 16, wherein R$^1$ and R$^2$ each independently represent a methyl group, an ethyl group or a propyl group.

19. The method of claim 16, wherein A represents hydroxyl.

20. The method of claim 16, wherein the molecular sieve has the ISV framework type, the BEA* framework type, the CHA framework type, the AEI framework type, the framework type of ITQ-21, or any combination of these framework types.

21. The method of claim 16, wherein the compound of formula (I) is a N,N-dimethyldicyclohexylammonium compound.

22. The method of claim 16, wherein the compound of formula (I) is N,N-dimethyldicyclohexylammonium hydroxide.

23. The method of claim 16, wherein the compound of formula (I) is a N,N-methylethyldicyclohexylammonium compound.

24. The method of claim 16, wherein the compound of formula (I) is N,N-methylethyldicyclohexylammonium hydroxide.

25. The method of claim 16, wherein the molecular sieve comprises silicon.

26. The method of claim 25, wherein the molecular sieve further comprises germanium.

27. The method of claim 25, wherein the molecular sieve crystal composition further comprises aluminum.

28. The method of claim 26, wherein the molecular sieve crystal composition further comprises aluminum.

29. The method of claim 27, wherein the molecular sieve crystal composition further comprises phosphorus.

* * * * *